United States Patent
Jousse et al.

(10) Patent No.: US 8,762,007 B2
(45) Date of Patent: Jun. 24, 2014

(54) CONTROL UNIT AND METHOD FOR TRIGGERING PASSENGER PROTECTION MEANS FOR A VEHICLE

(75) Inventors: Alain Jousse, Stuttgart (DE); Jochen Schomacker, Reutlingen (DE); Hartmut Schumacher, Freiberg (DE); Matthias Siemss, Gomaringen (DE); Steffen Walker, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 305 days.

(21) Appl. No.: 13/184,329

(22) Filed: Jul. 15, 2011

(65) Prior Publication Data
US 2012/0109467 A1 May 3, 2012

(30) Foreign Application Priority Data

Jul. 21, 2010 (DE) .......................... 10 2010 031 596

(51) Int. Cl.
*B60R 22/00* (2006.01)

(52) U.S. Cl.
USPC ............ 701/45; 701/99; 280/728.1; 280/735

(58) Field of Classification Search
USPC ............ 701/45, 99; 361/247; 280/728.1, 735
See application file for complete search history.

(56) References Cited

U.S. PATENT DOCUMENTS

| | | | | |
|---|---|---|---|---|
| 5,442,244 A | * | 8/1995 | Furui | 307/10.1 |
| 5,597,179 A | * | 1/1997 | Kornhauser | 280/735 |
| 5,646,454 A | * | 7/1997 | Mattes et al. | 307/10.1 |
| 5,734,318 A | | 3/1998 | Nitschke et al. | |
| 6,072,246 A | * | 6/2000 | Schafer | 307/10.1 |
| 7,142,407 B2 | * | 11/2006 | Sibrai | 361/247 |
| 7,154,733 B2 | * | 12/2006 | Sibrai | 361/248 |
| 2010/0258099 A1 | * | 10/2010 | Andersson et al. | 123/676 |

FOREIGN PATENT DOCUMENTS

| | | | |
|---|---|---|---|
| DE | 19527420 | | 1/1997 |
| EP | 04392016 | * | 3/2004 |
| JP | 406293246 A | * | 10/1994 |
| JP | 09240416 A | * | 9/1997 |
| JP | 02003040076 A | * | 2/2003 |
| JP | 02008265614 A | * | 11/2008 |
| JP | 02012136197 A | * | 7/2012 |

OTHER PUBLICATIONS

Development of airbags for locomotive crew protection; Zaouk, A. ; Kasturi, S. ; Punwani, S.K. ; Nagarajan, H.; Rail Conference, 2006. Proceedings of the 2006 IEEE/ASME Joint; Digital Object Identifier: 10.1109/RRCON.2006.215301 Publication Year: 2006 , pp. 115-120.*

Occupant Pose and Location Detect for Intelligent Airbag System Based on Computer Vision; Ying Yang ; Guangyao Zao ; Jing Sheng; Natural Computation, 2008. ICNC '08. Fourth International Conference on; vol. 6; Digital Object Identifier: 10.1109/ICNC.2008.599; Publication Year: 2008 , pp. 179-182.*

(Continued)

*Primary Examiner* — Cuong H Nguyen
(74) *Attorney, Agent, or Firm* — Kenyon & Kenyon LLP

(57) ABSTRACT

A control unit and a method for triggering passenger protection device for a vehicle are described, a computer having an integrated circuit transmitting a signal and, as a function of this signal, a current source in the integrated circuit outputting a current for charging the capacitors connected to the integrated circuit and situated in the ignition circuit. The charge of these capacitors is output via a third interface using a characterizing measuring signal.

10 Claims, 4 Drawing Sheets

(56) References Cited

OTHER PUBLICATIONS

Testing reverse polarity energy reserve capacitor with the automatic crash event generator; Gavrila, S. ; Lie, I. ; Electronics and Telecommunications (ISETC), 2012 10th International Symposium on; Digital Object Identifier: 10.1109/ISETC.2012.6408131; Publication Year: 2012 , pp. 15-18.*

A microprocessor-controlled variable impedance adaptive fault current limiter; King, E.F. ; Chikhani, A.Y. ; Hackam, R. ; Salama, M.M.A.; Power Delivery, IEEE Transactions on; vol. 5 , Issue: 4; Digital Object Identifier: 10.1109/61.103679; Publication Year: 1990 , pp. 1830-1838.*

* cited by examiner

CONTROL UNIT AND METHOD FOR TRIGGERING PASSENGER PROTECTION MEANS FOR A VEHICLE

CROSS REFERENCE

This application claims the benefit under 35 U.S.C. §119 of German Patent Application No. DE 102010031596.6, filed on Jul. 21, 2010, which is expressly incorporated herein by reference in its entirety.

FIELD OF THE INVENTION

The present invention relates to a control unit and a method for a triggering passenger protection device for a vehicle.

BACKGROUND INFORMATION

German Patent Application No. DE 195 27 420 B4 describes an electronic device configured as an airbag control unit. An ignition element connected to the control unit is provided with the output signal of an oscillator circuit, the output signal of the oscillator circuit being checked with a comparator.

SUMMARY

An example control unit according to the present invention and an example method according to the present invention for triggering a passenger protection device for a vehicle may have the advantage that monitoring of capacitors installed between an integrated circuit and the ignition element, which is located outside of the control unit on the control unit side, is now also possible. A charging process of these capacitors is advantageously used to characterize the capacitors. The integrated circuit is triggered by a signal via computer to perform the charging. The measuring signal characterizing the charging of the corresponding capacitors may then be recorded via a corresponding interface. A measurement via an external measuring device is then possible during production, for example, and a measurement via voltage monitoring by the control unit, for example, is possible through the integrated circuit in particular.

The current source used in the integrated circuit may advantageously also be used for other measurements of the ignition element, for example, and the ignition circuit in general. Thus the present invention may be implemented easily through only a few steps. In particular this saves measuring points on the circuit board of the control unit for testing these capacitors at these measuring points during production. This permits space savings on the circuit board and thus reduces costs. The cost for testing personnel during manufacturing such control units may thus be reduced in a meaningful manner. The present invention is applicable during production and also for use in the field.

A control unit is understood to be an electrical device which processes sensor signals and triggers passenger protection devices such as airbags or seatbelt tighteners as a function of the sensor signals. Triggering is understood to refer in particular to the activation of such passenger protection device.

The integrated circuit may have a wide variety of components and is present as a so-called system ASIC, for example, which integrates various functions which had previously been distributed among individual components. This system ASIC has the function to ignite the ignition element using electrical current in the event of deployment and testing this ignition element during normal operation using a test current, which is lower than the ignition current. These components include an electrical current source, which is connected by circuitry to the output of the control unit, this output connecting the control unit to the ignition element(s) in the passenger protection device. The capacitors may be switched between this point and ground. The capacitors in particular have the function of dissipating interfering voltage pulses to ground. The electromagnetic compatibility should thereby be improved. The ignition element, which is outside of the control unit, is thus connected to the interfaces of the integrated circuit via two ports. This connection is protected to ground on the control unit side by the capacitors for such voltage pulses.

The computer is usually a microcontroller, which may be a single-core or multi-core computer. This computer is connected to the integrated circuit to transmit a signal to this integrated circuit, this signal carrying the output of a current over the first interface to the first or second capacitor.

The third interface allows the charge of the corresponding capacitors to be picked up via a characterizing measuring signal and is only a line connection to the capacitors, for example. However, this interface may also have a certain measure of intelligence with its own evaluation. Other signal processing steps may also be integrated into this interface.

The computer advantageously transmits a software command to the integrated circuit as the signal. This software command thus indicates which current is applied to the line by the electric current source and, if necessary, also indicates other ambient parameters, for example, how and when, the counter is started, etc. The integrated circuit thus has an arrangement for understanding this software command, for example, a decoder and a connected control unit. Use of a serial interface between the computer and the integrated circuit, such as that provided by the serial peripheral interface, for example, is helpful in such a transmission. However, other forms of digital transmission are also possible in the present case. Five lines, which are assigned to different functions, are used with the serial peripheral interface. In addition to the cycle, there is the enable line, the chip select line and the lines for data transmission from the so-called master to the slave (MOSI) and the other line in the other direction (MISO). As the master, the computer transmits the software command over this line to the integrated circuit as the slave. The software command may assume a wide variety of different forms. For example, the software command may define the level of the electrical current as a datum. However, a datum which interprets the integrated circuit in such a way that it takes one of two presets currents, for example, may also be included. The software command thus defines a current level for the charging of the capacitors.

The first and second interfaces of the integrated circuit are advantageously switched to the same potential.

The third interface is connected to at least one voltmeter, a counter in the control unit being operated as a function of a voltage measured by the at least one voltmeter. A voltmeter is understood by those skilled in the art to refer to conventional circuits for measuring the voltage.

The measured voltage is advantageously compared with a voltage band with the aid of at least one comparator, the counter being started after reaching the lower end of the band and being stopped on reaching the upper end of the band. This means that the comparator compares the measured voltage with predefined voltage values which span a voltage band. An optimal voltage range may thus be selected to guarantee a reliable measurement of the voltage and thus the charge of the capacitor.

The counter counts up to a maximum counter reading. This means that when the comparator does not detect the upper end of the band, the counter does not continue to count arbitrarily but instead only up to a certain point in time and then stops. This may be interpreted as an error, for example.

In addition, an enable circuit is provided in the control unit, enabling the signal as a function of at least one additional measurement with respect to an ignition circuit. This means that if a measurement of shunts, short circuits or resistance values turns out positive with respect to the ignition circuit, for example, i.e., there are no errors of this type and the resistance of the ignition element is within a predefined range, then the measurement of the capacitance of the capacitors may be performed. However, if such a measurement turns out negative, the enable circuit will not enable measurement of the capacitance because there is already an error.

BRIEF DESCRIPTION OF THE DRAWINGS

Exemplary embodiments of the present invention are shown in the figures and explained in greater detail below.

DETAILED DESCRIPTION OF EXAMPLE EMBODIMENTS

Figure 1:
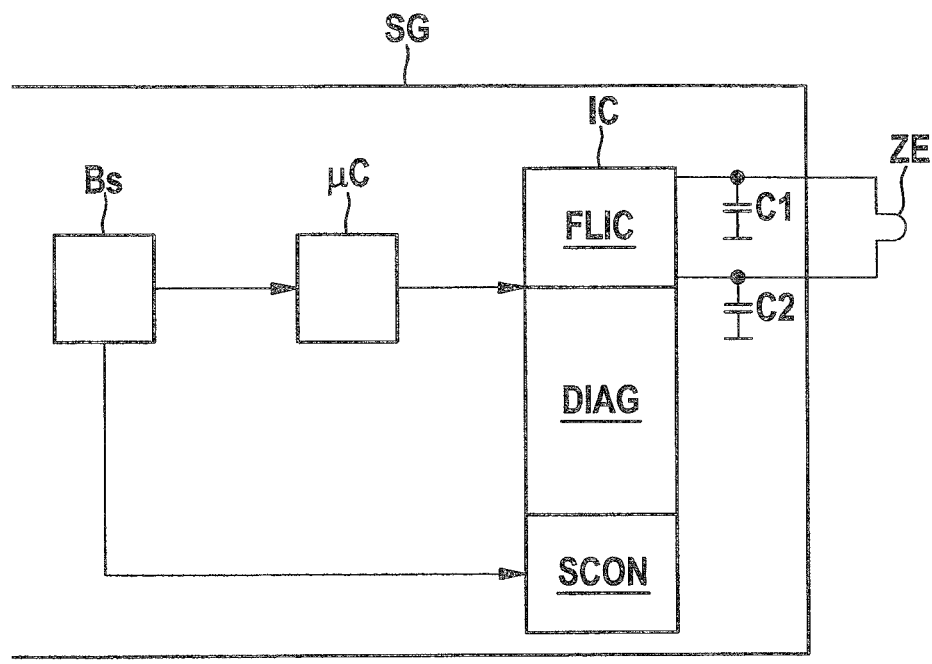
FIG. 1 shows a block diagram of an example control unit according to the present invention having a connected ignition element.

FIG. 1 shows in a block diagram control unit SG according to the present invention having a connected ignition element ZE. In the present case, only the components relevant for an understanding of the present invention are shown, but other components which are necessary for operation of control unit SG but not for an understanding of the present invention are omitted for the sake of simplicity. For triggering of passenger protection means such as airbags or seatbelt tighteners a control unit is situated in the area of the vehicle tunnel, in particular when it has self-acceleration sensors or yaw rate sensors. A sensorless control unit could also be placed in other suitable locations. In this case, the sensors are present outside of the control unit, for example, in a sensor control unit. The control unit usually has a plastic housing or a metal housing. This housing contains at least one circuit board on which the described components are mounted.

An acceleration sensor system BS transmits its measuring signal to a computer μC as the acceleration signal according to a predefined algorithm. The acceleration signal of acceleration sensor system BS is processed, however, in parallel by a system ASIC IC, i.e., an integrated circuit according to the present invention by a safety controller, which is situated on this integrated circuit IC. This safety controller SCON has a simpler algorithm than computer μC and tests the acceleration signals in parallel for whether or not there is a deployment case. The trigger decision is transmitted by computer μC to a trigger circuit FLIC, which is also situated on integrated circuit IC. This trigger circuit FLIC is enabled by safety controller SCON if safety controller SCON has found that the acceleration signal indicates a deployment case. Trigger circuit FLIC then energizes an ignition element ZE, which is situated outside of control unit SG, to inflate an airbag, for example. A plurality of ignition elements is usually connected to integrated circuit IC. According to the present invention, computer μC transmits a software command to integrated circuit IC and the latter is able to interpret this command via an electronic analyzer unit. This software command determines that a diagnostic part DIAG checks the capacitance of capacitors C1 and C2. These capacitors C1 and C2 are each connected to ground to the line to ignition element ZE. They have the task of improving the electromagnetic compatibility of the circuit. The capacitance of these capacitors C1 and C2 is determined on the basis of their charge. This charge is monitored via a voltage rise. The voltage rise may be detected via an interface through either integrated circuit IC itself or an external transient recorder. The external approach is recommended in particular during the production of this control unit SG to then be able to have a reference value for later measurements in the field.

For these later measurements, it is necessary, for example, for integrated circuit IC to have a voltage measurement to detect the voltage across capacitors C1 and 22. Ignition element ZE has a low resistance, so it may be interpreted as a short circuit. To measure the corresponding capacitance during production, ignition element ZE may also be removed in order to measure only the capacitance of C1, for example, and when ignition element ZE has been reconnected, to measure the combined capacitance of C1 and C2, to then determine the capacitance of C2 individually. With a connected ignition element ZE in the field, only the combined capacitance C1 and C2 is always measured to check it on the basis of the stored capacitance of C1 and C2. However, integrated circuit IC performs other measurements with regard to shunts, the ohmic resistance of ignition element ZE and of short circuits prior to this test of capacitance. Only when these other measurements have been passed is the presently described measurement of capacitor C1 and C2 performed.

Figure 2:
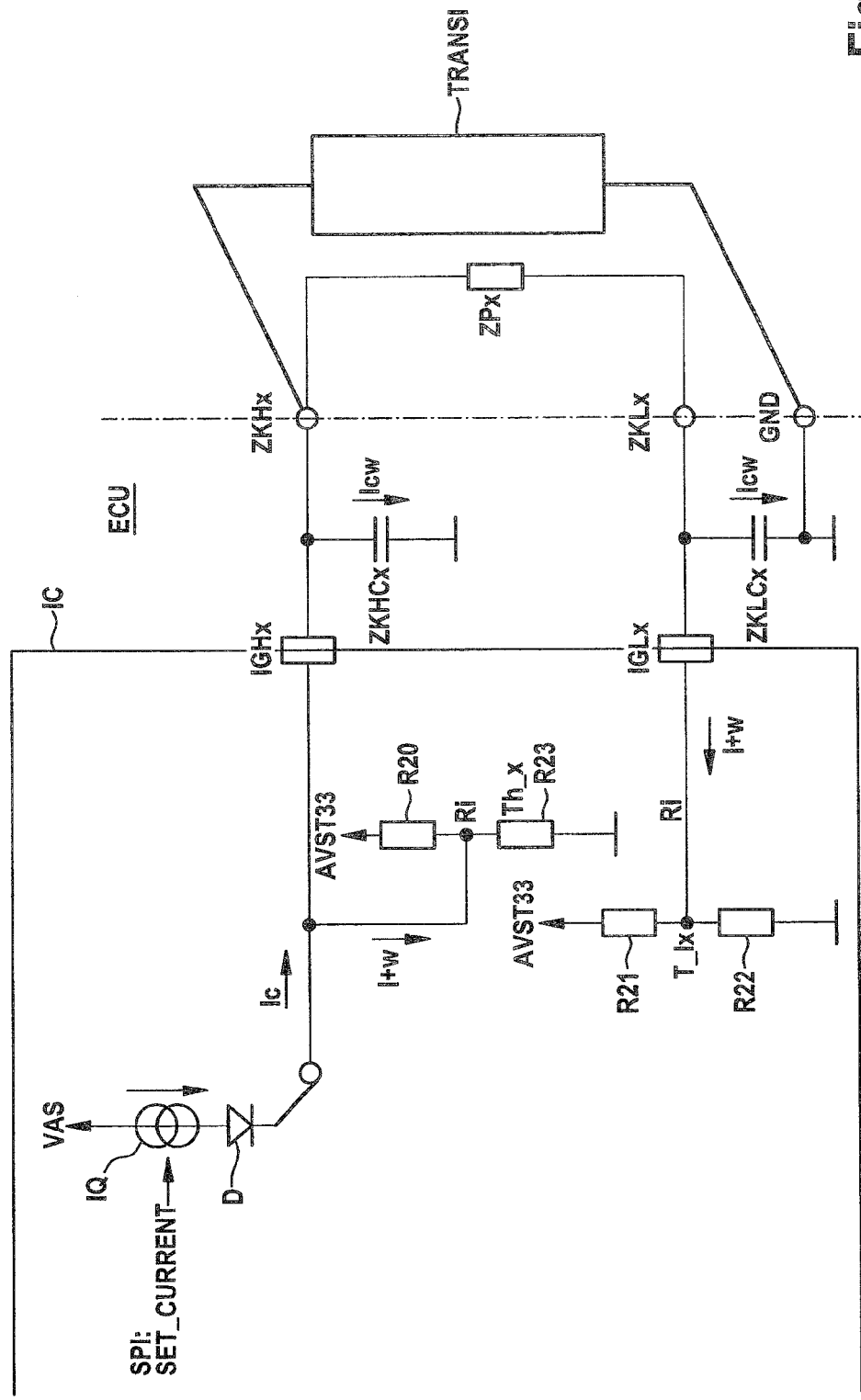
FIG. 2 shows a circuit of the integrated circuit having the components connected.

FIG. 2 shows in a schematic diagram a first embodiment variant of the present invention which may be used in particular during production. A detail of the integrated circuit μC and the ignition circuit, which is connected to the μC is shown here. Control unit ECU, as explained above, has integrated circuit IC and the dashed line shows that terminals ZKHx and ZKLx are present for connecting ignition element ZPx. In the present case, only a single ignition circuit x is shown. As already described above, however, a vehicle has a plurality of such ignition circuits so that corresponding interfaces must also be provided for them. The interfaces of the integrated circuit as well as the capacitors are to be designed according to the ignition circuits. A voltage of, for example, ⅓*VST33=1.1V±5% is applied at terminals ZKHx and ZKLx by voltage dividers R20 and R23. This relatively low tolerance is derived from the exact regulating voltage VST33±3% and the resistance divider ratios with ±2%, which are to be mapped well on integrated circuit IC. The internal resistance of the voltage divider is 6.66 kΩ. Due to the relatively high tolerance of integrated resistances, this results in a tolerance of the divider resistances of up to ±25%.

To measure ignition circuit resistance ZPx, a current source is triggerable in integrated circuit IC via an SPI (serial peripheral interface) command over this serial interface between computer μC and integrated circuit IC. This current source is labeled as IQ. This current source is designed for a current of 40 to 60 milliampere±12%. This measuring current is well-suited for the resistance measurement of the ignition circuit without having any negative effect on firing pellet ZPx.

Within the scope of the present invention, a second current value of current source IQ is defined via an additional SPI command for measuring the capacitance of the ignition circuit in V-capacitors ZKHCx and ZKLCx. This current value is selected in such a way that the most precise possible capacitance measurement may be performed. In the present case, this ignition circuit capacitance measurement is performed according to a first specification by SPI commands of the computer in the production mode of the control unit. The following steps are prompted:
a) The ignition circuit is closed across an ignition circuit resistance of 3Ω (2Ω to 4Ω). The line length is less than 6 meters.
b) Measuring current source IQ in circuit x is set at a capacitance measuring current of 4 milliampere, for example, or a range of 2 milliampere to 10 milliampere.
c) The capacitance measuring current is switched on for a duration of 200 microseconds.
d) The capacitance measuring current charges the capacitance of capacitor ZKHCx and charges the capacitance of capacitor ZKLCx via the ignition circuit resistance.
e) The voltage on capacitor ZKHCx is recorded using a transient recorder in the so-called end of line test and triggered by exceeding the ZKHx voltage of 1500 millivolt, for example, to control unit ground. The sampling rate is 1 microsecond and the sampling depth is 200 microseconds.
f) The measurement is repeated with an open ignition circuit to ascertain the ZKHx capacitance alone.
g) Likewise the ZKLx capacitance may be inferred from the ZKx total capacitance and the ZKHx capacitance.

At an ignition circuit capacitance of 100 nanofarad on each side, approximately 50 microseconds in first approximation is needed for a voltage swing of 1V at ZKHx to ground.

In equation mode TM is approximately 1V*2*100 nanofarad through IC.

A first error is caused by the resistance divider at interfaces IGHx and IGLx in, integrated circuit IC. This may be taken into account by knowing the internal resistance of the divider and the voltage of the divider except for an individual tolerance.

An average current flow between measuring voltage limits 1.5 V and 2.5 V of 270 milliampere=2*(((1.5V+2.5V)/2)-1.1V)/6667Ω is obtained using RI=6.67 KΩ±25% and divider voltage 1.1V±5%. Therefore, the effective average ignition circuit capacitance measuring current ICW=4 milliampere±12%-0.270 milliampere±31%=3.73 milliampere±15%.

Due to the sampling rate of 1 microsecond, a maximum error of 2 microseconds occurs at a typical measurement period of 53.6 microseconds in equation mode $TM_{type}$=53.6 microseconds=(1V*2*100 nanofarad/3.73 milliampere). This corresponds to another measuring error of 3.7%. The voltage measuring error of the transient recorder may be estimated at approximately 1%. The effective average measuring current of ICW/2, which flows in first approximation into the ignition circuit capacitance at ZKLx, induces a voltage of 5.8 mmV±46.5% at the maximum resistance of 3Ω±1Ω. The inductance of the ignition circuit line also results in a time-delayed charge of the ZKLx capacitance of approximately 2 microseconds±1 microsecond. The sum of the two effects causes an asymmetrical division of the measuring current and causes a capacitance measuring error of 6%.

The sum of the ignition circuit capacitances may be checked with a precision of ±26% at an ignition circuit cable length of 6 meters back and forth. The sum of the ignition circuit capacitances may be checked with a precision of ±20% at an ignition circuit cable length of 1 meter back and forth. With a ±10% tolerance of the ignition circuit capacitances at room temperature, a production error limit of 140 nanofarad to 260 nanofarad for the total capacitance may be achieved at a rated capacitance of 100 nanofarad at ZKHx and ZKLx to ground.

By opening the ignition circuit, the ignition circuit capacitance at ZKHx may be determined. This method corresponds to that described above but only the ignition circuit capacitor at ZKHx is charged beyond the resting level. To achieve a comparable precision, the voltage rise from 1.5V to 3.5V in the transient recorder is evaluated.

$$ICW=4 \text{ milliampere} \pm 12\% - 0.2 \text{ milliampere} \pm 29\% = 3.8 \text{ milliampere} \pm 14\%.$$

The ignition circuit capacitance at ZKHx may be checked with a precision of approximately 20%. With a ±10% tolerance of the ignition circuit capacitance at room temperature a production error limit of 70 nanofarad to 130 nanofarad may be achieved at a rated capacitance of 100 nanofarad at ZKHx to ground.

The ZKLx capacitance may be ascertained from the measurement of the total capacitance and the ZKHx capacitance.

It is thus possible to reliably ensure during production that the selected assembly has been performed without errors within a tolerated band.

Figure 3:
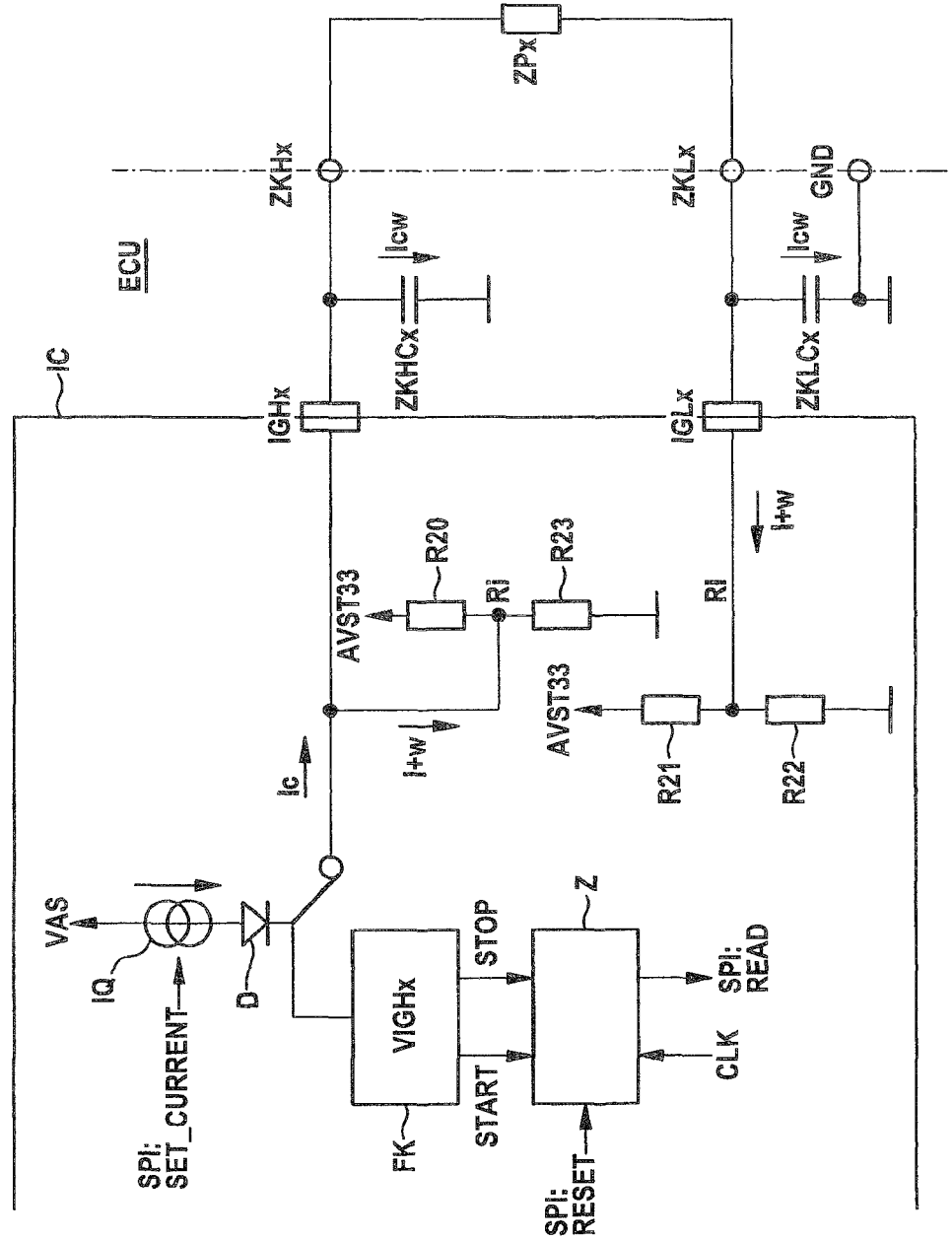
FIG. 3 shows another specific embodiment of such a circuit.

FIG. 3 shows a second exemplary embodiment of the present invention because now the variant which includes the measurement is omitted. The ignition circuit capacitance measurement is thus performed by computer SPI commands in the starting phase or typically during operation of the control unit. The following steps are prompted:
a) The ignition circuit is closed across an ignition circuit resistance of 2.5Ω. The line length back and forth is less than 20 m. There is no ignition circuit shunt or ignition circuit resistance error.
b) Measuring current source IQ in circuit x is again set at a capacitance measuring current target value of 4 milliampere.
c) The capacitance measuring current is activated for a period of 200 microseconds.
d) The capacitance measuring current allows the ignition circuit capacitance on the ZKHx side and the ignition circuit resistance at the ignition current capacitance on the ZKLx side.
e) The voltage rise time at ZKHx, triggered by a counter with a resolution of 1 microsecond, is measured by a window comparator FK with window limits of 1500 millivolt and 2500 millivolt in integrated circuit IC. The counter depth is 250 microseconds. The counter is labeled as Z.

Figure 4:
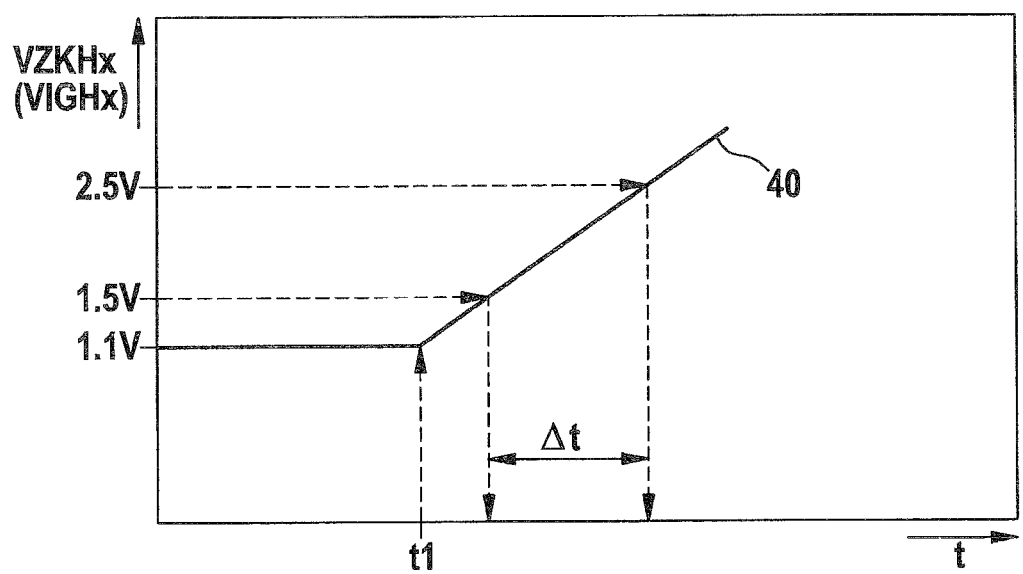
FIG. 4 shows a voltage-time curve of the voltage across the capacitors.

FIG. 4 shows a voltage-time diagram in which the voltage via one of the capacitors, shown here on capacitor ZKHCx. The voltage is 1.1V at the start and is set at the same value on both interfaces IGHx and IGLx. Through applied current IC=4 milliampere the voltage is charged in a linear characteristic as represented by curve 40. Point in time T1, because it is in the discontinuity, is not regarded as suitable for starting the counter but instead 1.5V and 2.5V define the voltage band in the present case, the measurement then being performed via δT.

Figure 5:
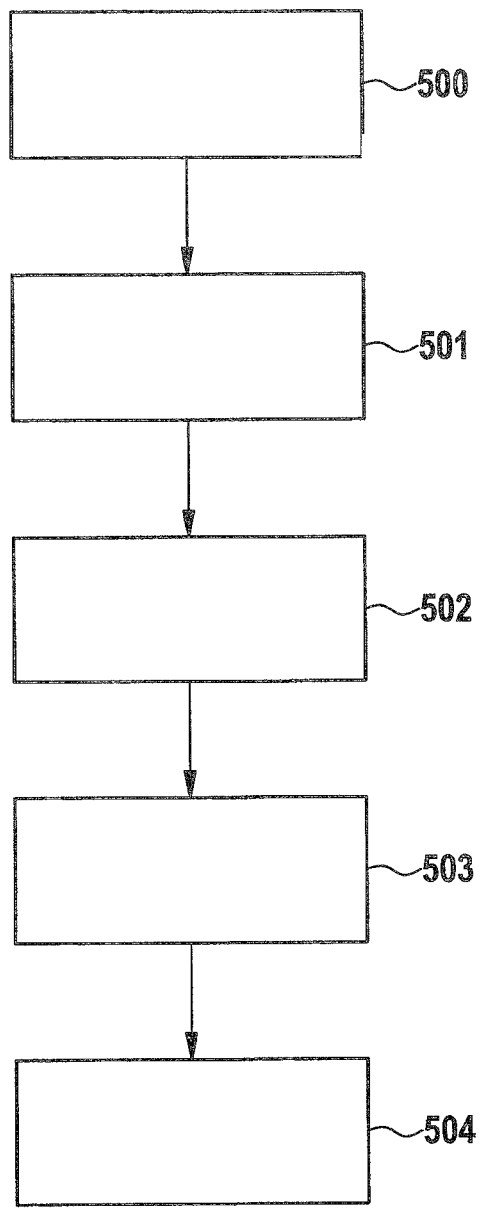
FIG. 5 shows a flow chart of the method according to the present invention.

FIG. 5 shows the method according to the present invention in a flow chart. In method step 500, the software command takes place from computer μC to integrated circuit IC. Thereupon, current source IQ is set in method step 501, for example, to the measuring current of 4 milliampere. This current is then applied to the ignition circuit. Capacitors C1 and C2 are thereby charged in method step 502. The charge is thus measured in parallel with the charge in method step 503, for example, by a voltmeter provided in the integrated circuit or by an external transient recorder. These values are evaluated in method step 504 to determine the capacitance and to ascertain whether the capacitance is within the predefined band.

The numerical values given above are purely exemplary. Other numerical values are also possible, depending on the given situation.

What is claimed is:

1. A control unit for triggering a passenger protection device, comprising:
    an integrated circuit to trigger using at least one current source; which is connected via a first interface of the integrated circuit to a first terminal for an ignition element which is outside the control unit;
    at least one first capacitor which is connected to the first terminal and to the first interface;
    at least one second capacitor which is connected to a second terminal for the ignition element and to a second interface of the integrated circuit;
    a computer which transmits a signal to the integrated circuit so that the current source charges at least one of the first and second capacitor by outputting a current via the first interface; and
    a third interface via which a measuring signal characterizing a charge of the at least one of the first and second capacitor may be recorded.

2. The control unit as recited in claim 1, wherein the computer is configured to transmit a signal of a software command to the integrated circuit.

3. The control unit as recited in claim 1 wherein the computer is connected to the integrated circuit via a serial interface.

4. The control unit as recited in claim 2 wherein the software command defines a current level for the charge.

5. The control unit as recited in claim 1, wherein the first and the second interfaces are switched to the same potential.

6. The control unit as recited in claim 1, wherein the third interface is connected to at least one voltmeter, a counter in the control unit being operated as a function of a voltage measured by the at least one voltmeter.

7. The control unit as recited in claim 6, wherein the measured voltage is compared with a voltage band using at least one comparator, the counter being started after reaching a lower end of a band and being stopped on reaching an upper end of the band.

8. The control unit as recited in claim 7, wherein the counter counts up to a maximum counter reading.

9. The control unit as recited in claim 1, further comprising:
    an enable circuit to enable the signal as a function of at least one additional measurement with respect to an ignition circuit.

10. A method for triggering a passenger protection device for a vehicle, comprising:
    transmitting a signal from a computer to an integrated circuit;
    outputting a current via a current source of the integrated circuit via a first interface of the integrated circuit as a function of the signal, at least one first capacitor and one first terminal for the ignition element being connected to the first interface, at least one second capacitor being connected to a second terminal for the ignition element and to a second interface of the integrated circuit;
    charging at least one of the at least one first and the at least one second capacitor with the current; and
    recording a measuring signal characterizing a charge of the at least one of the at least one first and the at least one second capacitor.

* * * * *